Aug. 15, 1967  J. G. DWYER ET AL  3,335,694
BISTABLE MAGNETIC PRESSURE INDICATOR
Filed Sept. 4, 1964  2 Sheets-Sheet 2
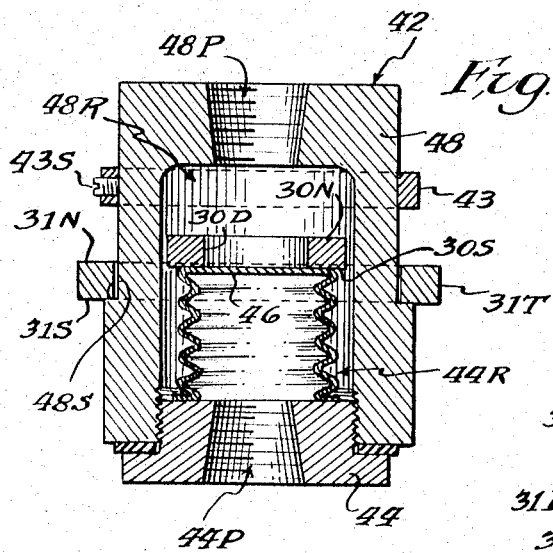
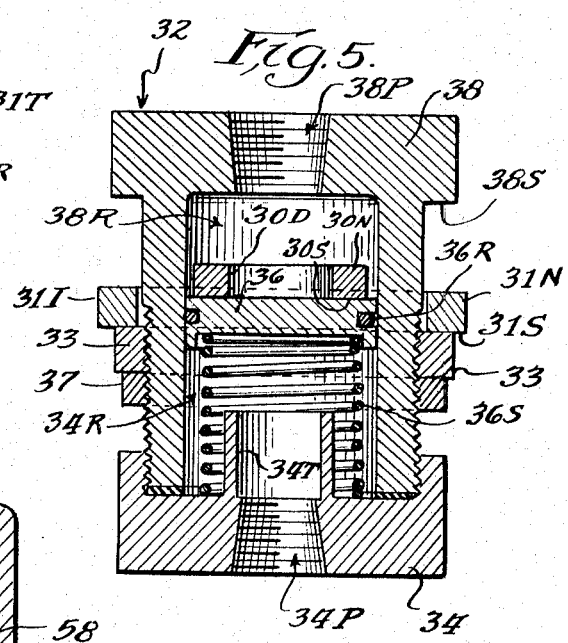
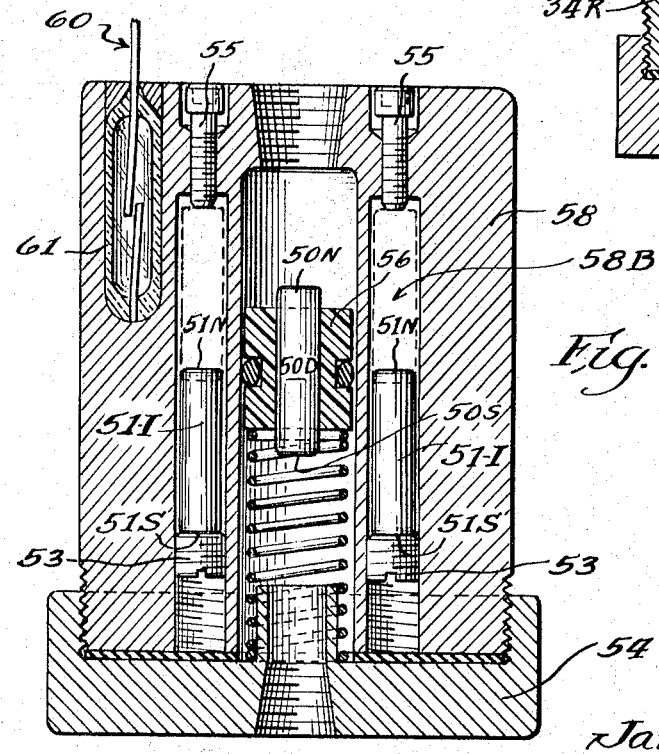
Inventors
James G. Dwyer and
John P. Locke
By Mann, Brown & McWilliams
Attys.

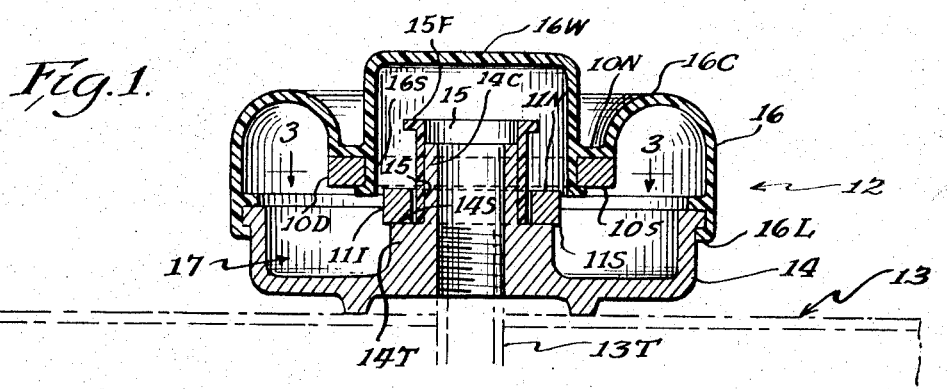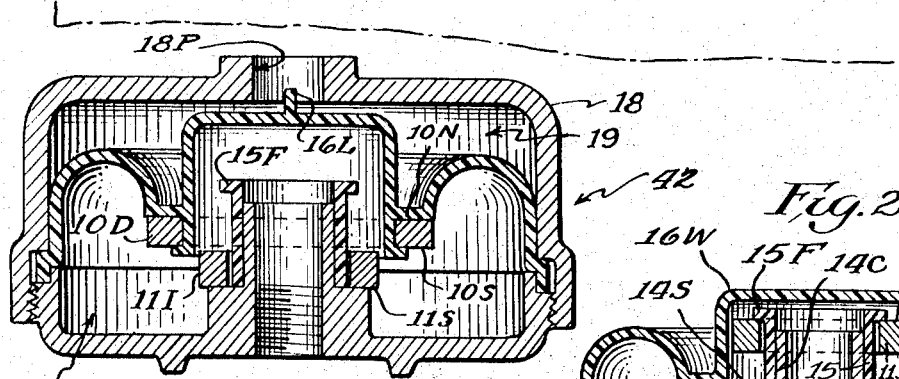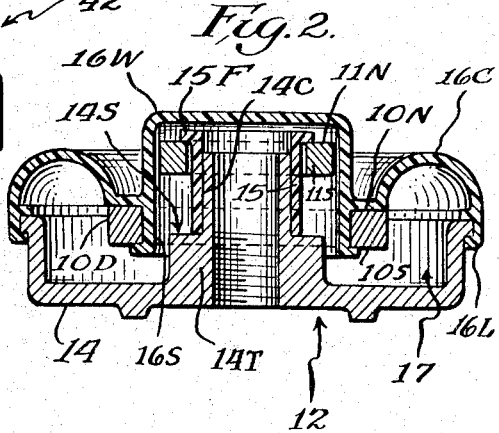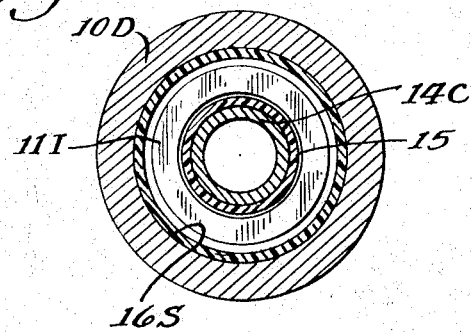

United States Patent Office 3,335,694
Patented Aug. 15, 1967

3,335,694
BISTABLE MAGNETIC PRESSURE INDICATOR
James G. Dwyer and John P. Locke, Michigan City, Ind., assignors to F. W. Dwyer Mfg. Co., a corporation of Illinois
Filed Sept. 4, 1964, Ser. No. 394,532
12 Claims. (Cl. 116—70)

ABSTRACT OF THE DISCLOSURE

A bi-stable repulsing magnetic pressure indicator for indicating when a predeterminel pressure has occurred in a device such as an automobile air or oil filter, having a free moving magnetic means mounted symmetrically with respect to an actuating magnetic means attached to a movable wall responsive to pressure change.

This invention relates to a force responsive indicator that operates upon attainment of a predetermined part movement to provide an indicating signal and more particularly is concerned with a pressure actuated indicator arrangement wherein the indicating signal is retained, pending reset, even after the initiating pressure condition is removed.

Pressure actuated indicators of this type are useful for determining the operating condition of equipment such as automobile air intake filters, diesel intake air cleaners, furnace air filters, dust collectors, and oil filters. In the usual application, the pressure drop across the filter may vary considerably in normal operation, but as the filter becomes seriously clogged, a determinable increase in the pressure drop develops. The indicator is selected an adjusted to operate at a suitably high pressure drop value to respond only upon clogging of the filter to provide a signal that is maintained even though the initiating pressure drop is no longer present.

The principal object of the invention is the provision of an improved and simplified pressure actuated indicator of this type.

Another object of the invention is the provision of an indicator utilizing a bi-stable repulsing magnet assembly that operates to provide a visual signal element that is movable to an indicating position in response to movement of other parts of the device and that independently maintains its indicating position after the other parts restore to normal position.

Still another object of the invention is the provision of a pressure actuated indicator that utilizes a bi-stable repulsing magnet assembly for accomplishing a sustained signal indication.

Other objects and advantages of the present invention will be apparent from the following description and claims, and are illustrated in the accompanying drawings which show structure embodying preferred features of the present invention and the principles thereof, and what is now considered to be the best mode in which to apply these principles.

In the accompanying drawings forming a part of this specification and in which like numerals are employed to designate like parts throughout the same:

FIGURE 1 is a vertical section through a static pressure indicator for use on an air intake filter of an automobile engine, with the parts of the filter being shown in normal position;

FIGURE 2 is a corresponding vertical section through the same indicator, with the parts being shown in indicating position;

FIGURE 3 is a sectional view taken as indicated on the line 3—3 of FIGURE 1;

FIGURE 4 is a vertical sectional view illustrating a differential pressure indicator utiilzing the basic construction features of the device of FIGURES 1–3;

FIGURE 5 is a vertical sectional view through a differential pressure indicator of modified form and characterized by the use of a spring biased piston as its sensing and actuating element;

FIGURE 6 is a vertical sectional view of a differential pressure indicator corresponding generally to that of FIGURE 5 and employing a bellows-type actuator element; and FIGURE 7 is a vertical sectional view of the differential pressure indicator of the type employing a piston-type actuating element associated with a symmetrical arrangement of rod magnets arranged to control a dry reed switch of a remote indicating circuit.

This invention makes use of a bi-stable repulsing magnet assembly for producing an indication in response to a predetermined initiating movement, with the indication being maintained after the initiating movement may have been retraced. The bi-stable repulsing magnet assembly is shown herein in three different forms. In FIGURES 1–4 this magnet assembly includes a drive magnet 10D and an indicator magnet 11I; in FIGURES 5 and 6, the magnet assembly includes a drive magnet 30D and an indicator magnet 31I, whereas in FIGURE 7, the magnet assembly includes a drive magnet 50D and indicator magnets 51I.

In the preferred practice of the invention, as illustrated in any of FIGURES 1 to 6, the bi-stable magnet assembly is comprised of a concentric pair of inner and outer ring magnets symmetrically disposed about a common central axis and magnetically interacting to produce relative movement between the magnets in a direction along their common axis. These magnets are polarized in the same sense along the direction of relative movement so that in the structures shown in FIGURES 1 to 4 the drive magnets 10D are polarized to present north and south poles as indicated at 10N and 10S, respectively, while the indicator magnet 11I is polarized so as to present north and south poles 11N and 11S, respectively. This pattern of polarization produces a bi-stable effect in that the magnets, whenever they are offset along the direction of their common axis, develop a repelling force urging them apart in the direction in which they are offset. Thus, in FIGURE 1, the drive magnet 10D is acting to urge the indicator magnet 11I in a downward direction, whereas in FIGURE 2 the drive magnet 10D is acting to urge the indicator magnet 11I in an upward direction. There is a theoretical balance point when the magnets are exactly aligned, but as a practical matter this condition is not maintained and any slight relative offset in either direction is then multiplied to offset the magnets further. This action characterizes each magnet assembly disclosed herein as a bi-stable repulsing magnet arrangement.

In the case of the magnet arrangement of FIGURES 5 and 6, the inner magnet ring is the drive magnet 30D and it is polarized to present north and south poles designated 30N and 30S, respectively, whereas the outer ring magnet is the indicator magnet 31I and it is polarized to present north and south poles 31N and 31S, respectively.

In the case of FIGURE 7, the drive magnet 50D is in the form of a cylindrical rod and it is polarized to present north and south poles designated 50N and 50S respectively. The indicating magnet in FIGURE 7 consists of a pair of cylindrical rod magnets 51I each of which is polarized to present north and south poles 51N and 51S, respectively. The indicator magnets 51I are arranged in symmetrical relation with respect to the drive magnet so that comparable magnetic interaction and bi-stable repulsion effects are achieved. The magnets may be barium ferrite ceramic magnets such as the type known as Indox.

Referring now to FIGS. 1 and 2, one embodiment of the invention as designated generally at 12 is arranged as a static pressure indicator and is shown mounted on top of an air intake filter 13 for an automobile engine. To establish a mechanical and fluid pressure connection, the filter 13 has an upwardly projecting tube 13T which is engageable with the indicator 12 to secure it in place in properly sealed communicating relation with the interior of the filter.

The indicator of FIGURES 1 and 2 includes a casing base 14 of hollow cup-shaped configuration and having an interior axial tubular stub 14T that provides a fluid communication passage leading upwardly from the connection tube 13T of the filter. The stub 14T is of annularly stepped configuration to present an upwardly facing annular shoulder 14S bordering the lower end of a cylindrical sleeve section 14C. This sleeve section is preferably fitted with a plastic sleeve 15 that terminates at its upper end in an overhanging flange 15F. The indicator 12 is provided with a flexible cover 16 having marginal lip structure 16L in external peripherally sealed contact with the upper edge of the cup shaped base 14 and cooperable therewith to define a pressure chamber 17 that encircles the stub 14T and is exposed through the stub passage and the tube 13T to pressure conditions at the downstream region of the filter 13. The cover 16 has an axially distortable annular convolution portion 16C integrally carrying a central wall member 16W which is shaped to present a closed annular sleeve 16S that encircles the stub 14T and is shiftable axially of the stub in accordance with distortion of the convolution portion 16C.

The bi-stable magnet assembly has its drive magnet 10D fixedly mounted to the central sleeve portion 16S of the cover 16 in encircling relation to the tubular stub 14T and has its indicator magnet 11I mounted in captive relation along the plastic sleeve 15 for free sliding movement under the control of the drive magnet 10D with the shoulder 14S and the flange 15F functioning as axially spaced limit stops determining the opposite ranges of movement of the indicating magnet 11I. The cover 16 is of a transparent elastomer to enable visual checking of the position of the indicating magnet 11I.

The parts of the indicator are shown in normal position in FIGURE 1 wherein the drive magnet 10D is offset vertically along the axis defined by the casing 14 and normally urges the indicating magnet 11I against the stub shoulder 14S. Thus, the stub shoulder functions as a normal position limit stop for the indicator magnet 11I. The cover 16 being of a transparent elastomer tends to resiliently yieldably resist distortion from this normal position illustrated in FIGURE 1. So long as the air filter is reasonably clean and exhibits only a slight pressure drop, the pressure differential across the cover 16 is slight so that the cover does not distort appreciably from its configuration of FIGURE 1. Upon progressive clogging of the filter, however, the cover 16 distorts and the drive magnet 10D moves downwardly in response to the pressure in the internal chamber being progressively decreased. This situation progresses until the drive magnet 10D moves beneath the indicating magnet 11I and becomes offset axially in the opposite direction whereupon the repulsing effect between the magnets immediately kicks the indicator magnet off of its normal position limit stop and holds it elevated.

The indicator position during further operation with the clogged filter is approximately as indicated in FIGURE 2. It will be noted that the drive magnet 10D has its lower extremity located beneath the normal position limit stop 14S, as is necessary to produce the reversing action for holding the indicating magnet 11I towards its upper extreme of movement. At this point, if the engine is turned off, the pressure across the cover 16 balances out and the cover restores to the position in which it is illustrated in FIGURE 1. It may be seen, however, that the position of the drive magnet in FIGURE 1 is offset vertically beneath the overhanging flange 15F so that the reaction between the magnets still holds the indicator magnet towards the upper limit stop presented by the overhanging flange. Therefore, while the pressure condition which produces the indication may no longer exist, the indication is maintained and serves to warn the operator or attendant that the filter 13 is clogged. Reset of the indicator may be effected simply by grasping the central wall 16W of the cover and flexing the cover upwardly sufficiently until the axial offset relation is reversed to cause the drive magnet 10D to reset the indicator magnet 11I to the normal position in which it is illustrated in FIGURE 1.

While the indicator, as disclosed in FIGURES 1 and 2, depends for its calibration upon the inherent resiliency of the convolution portion 16C of the cover 16, a supplemental spring may be provided to act between the drive magnet 10D and the base 14 where calibration requirements make this desirable. Variations in the calibration may also be achieved by providing the normal position limit stop 14S with a range of adjustment. The base 14 is preferably, but not necessarily, of non-magnetic material in order not to interfere with the magnetic interaction between the drive and indicator magnets. It should also be noted that the strengths of the magnets may easily be made great enough to override effects of gravity and thus enable the device to be used in any position.

The basic part arrangement shown for the static pressure indicator on FIGURES 1 and 2 is embodied in a differential form of indicator in FIGURE 4 wherein the principal change in structure consists of adding an upper casing 18 for establishing sealed relationship with the cover element 16 to define a pressure chamber 19 above this element. The upper casing 18 has a central opening providing a passage 18P through which remote pressure conditions are communicated. In the embodiment of FIGURE 4, the upper casing member should also preferably be transparent to enable visual inspection of the position of the indicator magnet. Reset of the differential-type indicator may be effected either by engagement of a lug 16L through the pressure communicating passage 18P, or by removal of the upper casing 18 to afford direct access to the flexible cover element 16.

The arrangements illustrated in FIGURES 1 to 4 are intended primarily for use in gas pressure systems. Embodiments for use in liquid pressure systems are shown in FIGS. 5 to 7 and each of these is illustrated as a differential pressure-type indicator.

The indicator arrangement of FIGURE 5 is designated generally at 32 and consists of a two-part casing having a base 34 and an upper section 38 conjointly defining a chamber of cylindrical form that extends axially therebetween. Thus, the base 34 constitutes one axial end wall and it has a separate passage 34P for communication with pressure conditions at a remote region. Similarly, the top section 38 provides another axially spaced end wall and it has a separate passage 38P for communication with pressure conditions at another remote region. A piston 36 of non-magnetic material is located within the chamber and is provided with an O-ring seal 36R to divide the casing into separate and distinct pressure regions 34R and 38R each communicating with a corresponding one of the passages 34P and 38P. This piston-type chamber dividing wall is shiftable axially in the casing in accordance with the pressure differential existing across it.

A compression-type calibration spring 36S is shown reacting between the base 34 and the piston 36 thereby determining the particular value of pressure differential required to trip the inidcator. The drive magnet 30D is shown fixedly attached to the piston 36 and the indicating magnet 31I is shown encircling the top section 38 of the casing for axially slideable movement therealong between an upper stop presented by an overhanging shoulder 38S formed thereon and a lower normal position limit stop provided in the form of a ring nut 33 that is threaded onto the casing section and locked in fixed position by a companion ring nut 37.

In FIGURE 5, the parts of the indicator 32 as shown in normal condition and the drive magnet 30D is offset vertically above the indicating magnet 31I and, thus, exerts a repulsing effect urging the indicating magnet toward its normal position limit stop 33. When the pressure differential across the piston 36 increases in a sense to cause the piston to move downwardly as viewed in FIGURE 5, the indicator magnet 31I will be tripped when the offset relationship existing between the magnets reverses, with the indicating magnet 31I moving up to engage against the upper stop 38S. It will be noted that the base section 34 of the casing is provided with a tubular stub 34T projecting upwardly within the compression spring 36S and functioning as a positive stop to limit downward piston travel. In the arrangement of FIGURE 5 it will be apparent that once the actuating conditions are removed, the piston 36 will restore to the position in which it is illustrated and at that position the drive magnet 30D will maintain the offset relation relative to the indicating magnet 31I and thereby will maintain indicating magnet elevated. When the actuating pressure condition no longer exists, the device is reset simply by grasping the indicating magnet 31I and forcibly lowering it against the repulsing effect of the drive magnet 30D until the offset relation is reversed. The parts then assume the position in which they are illustrated in FIGURE 5.

Another embodiment of differential pressure indicator is shown generally at 42 in FIGURE 6 wherein the casing is again in two parts and includes a base section 44 and a top section 48 sealingly engaged thereagainst and conjointly defining a chamber having an upper region 48R communicable with remote pressure conditions through a passage 48P provided in the top section of the casing and having a lower region 44R communicable with remote pressure conditions through a passage 44P provided through the base section 44 of the casing. A movable wall element 46 is provided in the embodiment of FIGURE 6 in the form of a bellows having the drive magnet 30D fixed to its transverse main face to undergo movement in an axial direction through the casing. The bellows 46 has an inherent resiliency which establishes the calibration of the unit. The normal position limit stop in FIGURE 6 is defined by an integral shoulder 48S that faces upwardly on the top section of the casing and the companion stop is in the form of a ring 43 mounted a predetermined distance thereabove and secured in place by a lock screw 43S. Once again in the initial position, the drive magnet 30D is offset above the indicating magnet 31I and is arranged to undergo downward movement in response to increasing pressure differential across the bellows 46 until the drive magnet reverses its offset relation and trips the indicator magnet to elevate it against the stop ring 43.

Finally, the embodiment of FIGURE 7 is patterned broadly after that of FIGURE 5, however, it employs, as mentioned previously, a symmetrical relationship of rod magnets as distinguished from ring magnets. The drive magnet 50D is a single rod magnet anchored in a piston 56 slideable in the top section 58 of the casing and the indicator magnet is a pair of rod magnets 51I slideable in drilled bores 58B provided in the top section of the casing in parallel flanking relation to the piston 56.

The initial position of the parts in the embodiment of FIGURE 7 is illustrated in full lines. It will be noted that the indicator rod magnets 51I have their lower ends engaged against adjustable screw plugs 53 which function as normal position limit stops. The piston 56 is movable downwardly against the action of the calibration spring 56S until it reverses the axial offset relation existing between the drive magnet 50D and the indicator magnets 51I, thereby tripping the magnet assembly and causing the indicator magnets to move upwardly towards a set of downwardly pointing screw plugs 55 that function as upper position limit stops. The indicator magnets 51I are shown in their actuated position in dotted lines. Where a remote indication is desired, an electrical utilization circuit represented generally at 60 may be provided. For this purpose the top section 58 of the casing may be provided with a socket to receive a conventional dry reed switch 61, having normally open contacts arranged to close in the event the indicating rod magnets 51I move to the dotted line position to effect polarizing of these contacts.

Thus, while preferred constructional features of the invention are embodied in the structure illustrated herein, it is to be understood that changes and variations may be made by those skilled in the art without departing from the spirit and scope of the appended claims.

What is claimed is:

1. In a device having a casing member and a wall member mounted for movement relative thereto and cooperatively engageable therewith to define separate regions on opposite sides of the wall member, said wall member being resiliently yieldably shiftable from a normal position relative to said casing to traverse a movement path in response to variations in effective differential force acting on said sides, an indicator arrangement comprising a bistable repulsing magnet assembly comprising first magnet means mounted in shiftable relation upon said casing member to undergo travel in a direction along said path and a second magnet means fastened to said wall member in substantially symmetrical relation to said first magnet means but normally offset therefrom in a direction along said path and adapted to interact magnetically therewith and urge the same in the direction of offset, and a normal position limit stop mounted along said casing member and engageable with said first magnet means to define a normal offset position wherein the first magnet means is intermediate of said stop and said second magnet means.

2. An arrangement in accordance with claim 1 wherein a pair of concentric magnet rings constitute said bistable repulsing magnet assembly.

3. In a pressure actuated device, a casing member, a wall member mounted for movement relative thereto and cooperatively engageable therewith to define separate regions on opposite sides of the wall member, said wall member being shiftable from a normal position relative to said casing member to traverse a movement path in response to variations in pressure between said regions, indicator means comprising a bistable repulsing magnet assembly comprising first magnet means mounted in shiftable relation along said casing member to undergo travel in a direction along said path and second magnet means fastened to said wall member in substantially symmetrical relation to said first magnet means but normally offset therefrom in a direction along said path, each magnet means being polarized in the same sense along the direction of such line so that the second magnet means interacts magnetically with the first magnet means and urges the same in the direction of offset, and a stationary normal position limit stop forming part of said casing member and engageable with said first magnet means to define a normal offset position wherein the first magnet means is intermediate of said stop and said second magnet means.

4. In a pressure actuated device having a casing member provided with a movable wall member having separate regions defined on opposite sides thereof, said wall member being shiftable relative to said casing in response to variations in differential pressure conditions between said regions, an indicator arrangement comprising a bistable repulsing magnet assembly consisting of substantially concentric inner and outer ring magnets and each polarized in the same sense, said magnets being fixed to one of said wall members and the other of said magnets being freely mounted on said casing and adapted to move relatively thereto, and a normal position limit stop mounted on said casing and engageable with said other magnet to define a normal position wherein said other magnet is intermediate of said stop and said one magnet.

5. In a pressure actuated device, a casing member, a wall member mounted for movement relative thereto and cooperatively engageable therewith to define separate regions on opposite sides of the wall member, said wall member being resiliently yieldably shiftable in opposite directions from a normal position relative to said casing to traverse a movement path in response to variations in pressure between said regions, indicator means comprising a normal position limit stop mounted on said casing member, and a bistable repulsing magnet assembly comprising first magnet means normally engaging said limit stop and mounted in shiftable relation upon said casing member to undergo travel along said path, and second magnet means fastened to said wall member substantially concentrically with said first magnetic means and occupying a location that is offset from said stop when said wall member is in normal position, said second magnet means being adapted to interact magnetically with said first magnetic means to urge the same in the direction of offset along said path, whereby when said wall member is in normal position said second magnet means urges said first magnet means towards said limit stop.

6. An arrangement in accordance with claim 5 wherein a pair of concentric magnet rings constitute said bistable repulsing magnet assembly.

7. In a device having a casing member and a wall member mounted for movement relative thereto and cooperatively engageable therewith to define separate regions on opposite sides of the wall member, said wall member being resiliently yieldably shiftable in opposite directions from a normal position relative to said casing to traverse a movement path in response to variations in effective differential force acting on said sides, an indicator arrangement comprising a normal position limit stop mounted on said casing member along said path, and a bistable repulsing magnet assembly comprising first magnet means normally engaging said limit stop and mounted in shiftable relation upon said casing member to undergo travel along said path, and second magnet means fastened to said wall member to occupy a location along said path that is offset said stop when said wall member is in normal position, said second magnet means being in substantially symmetrical relation to said first magnet means with respect to a line directed along said path to interact magnetically therewith and urge the same in the direction of offset along said path, whereby when said wall member is in normal position said second magnet means urges said first magnet means towards said limit stop.

8. A pressure actuated indicator comprising, in combination, a base of hollow cup-shaped configuration and having an interior axial tubular stub providing a fluid communication passage and equipped with a normal position limit stop, a flexible cover in an externally peripherally sealed contact with said base and cooperable with said base to define a pressure chamber encircling said stub and exposed to said passage, said cover having an axially distortable annular convolution portion carrying a closed central annular sleeve portion that encircles said stub and is shiftable axially thereof in accordance with distortion of said convolution portion, and a bistable repulsing magnet assembly comprising inner magnet means slideable axially along said stub and outer magnet means fastened to said sleeve portion in substantially concentric relation to said inner magnet means and offset from said stop when said cover is in normal position, said inner magnet being adapted to interact magnetically with said outer magnet to urge the same in the axial direction of offset existing between said magnets.

9. A pressure actuated indicator comprising, in combination, a base of hollow cup-shaped configuration and having an interior axial tubular stub providing a fluid communication passage and equipped with a normal position limit stop, a flexible cover in externally peripherally sealed contact with said base and cooperable with said base to define a pressure chamber encircling said stub and exposed to said passage, said cover having an axially distortable annular convolution portion carrying a closed central annular sleeve portion that encircles said stub and is shiftable axially thereof in accordance with distortion of said convolution portion, and a bistable repulsing magnet assembly comprising an inner ring magnet slideable axially along said stub and an outer ring magnet mounted fastened to said sleeve portion at a location axially offset from said stop when the cover is in normal position, to interact magnetically with said inner ring magnet and urge the same in the axial direction of offset existing between said magnets.

10. A pressure actuated indicator comprising, in combination, a base of hollow cup-shaped configuration and having an interior axial tubular stub providing a fluid communication passage and equipped with axially spaced limit stops, a flexible cover in externally peripherally sealed contact with said base and cooperable with said base to define a pressure chamber encircling said stub and exposed to said passage, said cover having an axially distortable annular convolution portion carrying a closed central annular sleeve portion that encircles said stub and is shiftable axially thereof in accordance with distortion of said convolution portion, and a bistable repulsing magnet assembly comprising an inner ring magnet mounted on said stub between said stops for axial shifting movement and an outer ring magnet fastened to said sleeve portion at a position offset from said inner magnet when said cover is in normal position, to interact magnetically with said inner ring magnet and urge the same in the axial direction of offset existing between said magnets.

11. A pressure actuated indicator comprising a casing defining a chamber having axially spaced ends and having a separate passage adjacent each end, means in said chamber providing a wall dividing the chamber into separate regions, each communicating with a separate one of said passages, said wall being shiftable axially in said chamber in response to a predetermined pressure differential across said regions, indicator means comprising a bistable repulsing magnet assembly comprising inner magnet means fastened on said wall and outer magnet means mounted on said casing for axially shifting movement therealong, said outer magnet means being disposed substantially symmetrically about said inner magnet means with respect to a line directed axially of said chamber and each magnet means being polarized in the same sense in the direction of said line to enable said inner magnet means to interact magnetically with said outer magnet means and urge a same in the direction along said line when said first and second magnet means are offset with respect to each other, and a normal position limit stop mounted along said casing and engageable with said outer magnet means to define a normal position wherein said outer magnet means is intermediate of said stop and said inner magnet means.

12. A pressure actuated indicator comprising a casing defining a chamber having axially spaced ends and having a separate passage adjacent each end, limit stops mounted in axially spaced relation along the casing, means in said chamber providing a wall dividing the chamber into separate regions, each communicating with a separate one of said passages, said wall having a normal position intermediately of said limit stops and being shiftable axially in said chamber in response to a predetermined pressure differential across said regions, and a bistable repulsing magnet assembly comprising inner magnet means fastened to said wall and outer magnet means mounted on said casing for axially shifting movement between said limit stops, said outer magnet means being disposed substantially symmetrically about said inner magnet means with respect to a line directed axially of said chamber and being offset from said inner magnet when said wall is in normal position, each magnet means being polarized in the same sense in the direction of said line to enable said inner magnet means to interact magnetically with said outer magnet means and urge the same in the direction of offset along said line one of said limit stops being mounted along said casing and engageable with said outer magnet means to define a normal position therefor.

References Cited

UNITED STATES PATENTS

| | | | |
|---|---|---|---|
| 2,182,469 | 12/1939 | Davis | 73—290.1 |
| 2,638,582 | 5/1953 | Verso et al. | 116—117 |
| 2,719,485 | 10/1955 | Bender. | |
| 3,062,054 | 11/1962 | Fitch | 73—410 |
| 3,125,062 | 3/1964 | Raupp et al. | 116—70 |
| 3,128,743 | 4/1964 | Whiting | 116—70 |
| 3,154,049 | 10/1964 | Smith et al. | 116—70 |
| 3,187,711 | 6/1965 | Campolong | 116—70 |
| 3,212,471 | 10/1965 | Willis | 116—70 |

FOREIGN PATENTS

| | | |
|---|---|---|
| 895,748 | 5/1962 | Great Britain. |
| 213,449 | 5/1941 | Switzerland. |
| 290,344 | 8/1953 | Switzerland. |

LOUIS J. CAPOZI, *Primary Examiner.*

UNITED STATES PATENT OFFICE
CERTIFICATE OF CORRECTION

Patent No. 3,335,694                                             August 15, 1967

James G. Dwyer et al.

It is certified that error appears in the above identified patent and that said Letters Patent are hereby corrected as shown below:

Column 6, line 71, before "said", first occurrence, insert -- one of --; same line 71, before "said", second occurrence, cancel "one of"; line 72, "members" should read -- member --. Column 8, line 52, "a" should read -- the --.

Signed and sealed this 9th day of September 1969.

(SEAL)
Attest:

Edward M. Fletcher, Jr.                             WILLIAM E. SCHUYLER, JR.
Attesting Officer                                             Commissioner of Patents